United States Patent [19]

Charlton

[11] Patent Number: 4,777,663

[45] Date of Patent: Oct. 11, 1988

[54] DATA RATE LIMITER FOR OPTICAL TRANSMISSION SYSTEM

[75] Inventor: David E. Charlton, Corning, N.Y.

[73] Assignee: Corning Glass Works, Corning, N.Y.

[21] Appl. No.: 894,576

[22] Filed: Aug. 8, 1986

[51] Int. Cl.[4] .............................................. H04B 9/00
[52] U.S. Cl. ................................. 455/612; 356/324; 370/3; 455/617
[58] Field of Search .................... 370/3, 4, 108, 9; 455/610, 612, 617, 606, 607, 600, 608; 350/96.19, 169, 170, 174; 356/324, 319, 330, 354

[56] References Cited

U.S. PATENT DOCUMENTS

| | | | |
|---|---|---|---|
| 4,296,319 | 10/1981 | Franks et al. | 455/612 |
| 4,405,199 | 9/1983 | Ogle et al. | 350/96.19 |

FOREIGN PATENT DOCUMENTS 59-97241  6/1984  Japan ..................... 455/600

*Primary Examiner*—Robert L. Griffin
*Assistant Examiner*—Leslie Van Beek
*Attorney, Agent, or Firm*—William J. Simmons, Jr.

[57] ABSTRACT

A dispersion transformer for limiting the data rate of an optical fiber transmission system. A transmission optical fiber, which connects a transmitter and a receiver, may have a bandwidth much greater than that necessary to transmit a desired predetermined maximum data rate. The transmitted signal is connected to wavelength disperser means which spatially separates the different wavelength components of the transmitted signal. Each wavelength component is then propagated with a different delay by optical fiber delay means. The wavelength component which propagates with the least delay through the transmission optical fiber is subjected to the least induced delay in the optical fiber delay means and that which propagates with the greatest delay through the transmission optical fiber is subjected to the greatest induced delay in optical fiber delay means, the remaining components being subjected to intermediate delays. The delayed wavelength components are combined to form a series of broadened optical pulses.

6 Claims, 1 Drawing Sheet

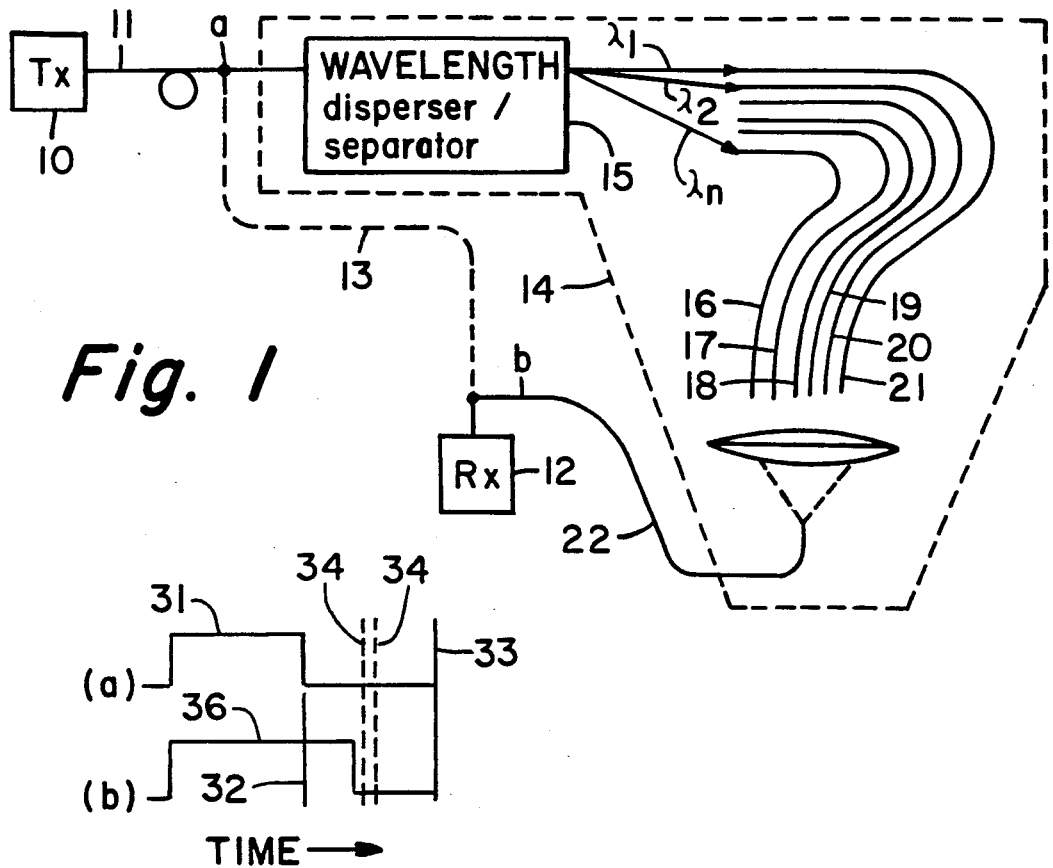
Fig. 1
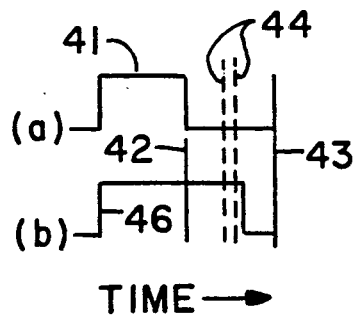
Fig. 3
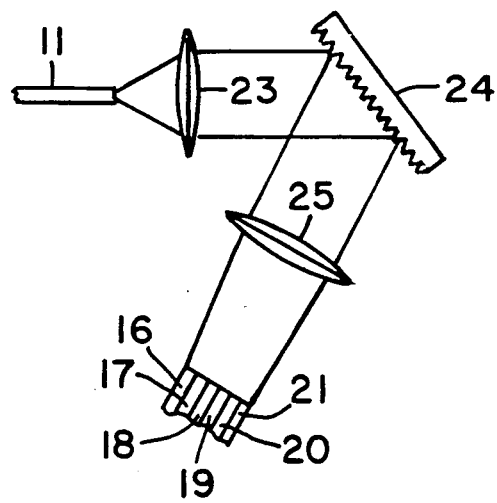
Fig. 2
Fig. 4

DATA RATE LIMITER FOR OPTICAL TRANSMISSION SYSTEM

BACKGROUND OF THE INVENTION

The present invention relates to optical fiber transmission systems and more particularly to a method and apparatus for introducing chromatic dispersion into such a system to limit its information carrying capacity.

It is sometimes desirable to limit the capacity of an optical transmission system to some predetermined maximum data rate. For example, a customer may purchase the sole use of a single-mode optical fiber transmission line and connect its own terminal equipment thereto. The price of using the transmission line may be based on the maximum data rate that the customer intends to transmit. The bandwidth of the single-mode fiber transmission line may be much greater than that currently needed by the customer.

SUMMARY OF THE INVENTION

It is an object of the present invention to provide a method and apparatus for limiting the information carrying capacity of an optical fiber transmission system to a predetermined maximum data rate.

The present invention has utility in an optical transmission system in which a transmission optical fiber is capable of transmitting data at a rate which is much greater than the rate at which it is desired to transmit data. This invention relates to a method of limiting the information carrying capacity of the optical transmission system so that only a maximum predetermined data rate can be transmitted therethrough. The method comprises generating a pulsed optical signal having a plurality of wavelengths, and propagating the optical signal through the transmission optical fiber. The optical signal is separated into a plurality of spatially separated wavelength components which are propagated through optical waveguide delay means where the wavelength components are subjected to different delays. The wavelength component which propagates with the least delay through the transmission optical fiber is subjected to the least induced delay in the optical fiber delay means, and the wavelength component which propagates with the greatest delay through the transmission optical fiber is subjected to the greatest induced delay in the optical fiber delay means. Those wavelength components which propagate through the transmission optical fiber with delays intermediate the least induced delay and the greatest induced delay are subjected in the optical fiber delay means to induced delays that are intermediate the least induced delay and the greatest induced delay. The delayed wavelength components are combined to form a transformed optical signal comprising a series of broadened pulses which is coupled to the receiver.

Each of the generated pulses has a predetermined pulse width. The detector ascertains the existance of a pulse in a predetermined time window which occurs near the center of the time duration of the pulse before it is broadened by the delay means. The difference in delay times between the greatest induced delay and the least induced delay is slightly less than the time lapse between the end of a pulse and the start of the window for the detection of the next pulse.

BRIEF DESCRIPTION OF THE DRAWING

FIG. 1 is a schematic illustration of the optical pulse broadening system of the present invention.

FIG. 2 is a schematic illustration of a monochromator which can be employed in the system of FIG. 1.

FIGS. 3 and 4 are pulse diagrams of signals appearing at points a and b of FIG. 1.

DETAILED DESCRIPTION

Telephone companies sometimes provide a customer with a "dark fiber", i.e. an optical fiber having no terminal equipment. Transmission optical fiber 11 of FIG. 1 is such a fiber. The customer may initially intend to connect to fiber 11 a particular transmitter 10 and a particular receiver 12 (a coupling that is illustrated by dashed line 13). With such terminal equipment, the customer may have the capability of transmitting data at a predetermined maximum data rate and may desire to be billed at a rate which depends upon that predetermined maximum data rate. Fiber 11 may be a single-mode fiber, for example, having a bandwidth capable of transmitting information at a rate much greater than the predetermined maximum rate. Since the terminal equipment is under the control of the customer, that terminal equipment could be upgraded by the customer so that the system would transmit information at a rate greater than the predetermined rate. However, if the telephone company had no knowledge of the change in terminal equipment, the customer could transmit information over the fiber at the higher rate while continuing to pay the lower price for using the fiber.

This situation can be avoided by limiting the system bandwidth to a value such that the maximum data rate that can be transmitted is that for which the customer has paid. The dispersion transformer or bandwidth limiting device 14 of FIG. 1 can be employed to effect such a result. Dispersion transformer 14 is similar to the system disclosed in French Patent Publication No. 2,535,555 and in copending U.S. patent application Ser. No. 894,631 entitled "Optical Fiber Dispersion Compensator" (V. A. Bhagavatula 6) filed on even date herewith. Transformer 14 may be connected between transmission fiber 11 and detector 12, as shown in FIG. 1, or it could be connected between source 10 and fiber 11. if two or more transmission fibers were connected in series a dispersion transformer could be connected between two such fibers.

Transformer 14 comprises wavelength disperser/separator means 15, which may consist of a passive optical device such as a grating, prism, filter, wavelength coupler, zone plate or the like or an active device such as an acousto- optic modulator or the like. Transmitter 10 comprises a laser diode, LED or the like, which initiates in fiber 11 the propagation of a multiple wavelength optical signal. Means 15 is capable of separating the optical signal emanating from fiber 11 into a plurality of spatially separated wavelength components. Three such components are represented by arrows in FIG. 1. Wavelength components $\lambda_1, \lambda_2, \ldots \lambda_n$ are incident on the core portions of the input endfaces of delay line fibers 16 through 21. The outputs from delay line fibers 16–21 are focused onto the endface of a relay fiber 22 which transmits the light to detector 12.

A specific wavelength disperser is shown in FIG. 2. Light from transmission fiber 11 is collimated by lens 23, and the resultant beam is directed onto grating 24. Light reflected from grating 24 is focused by lens 25 onto the ends of delay line fibers 16–21. Elements 23, 24 and 25 constitute a classical monochromator the characteristics of which can be calculated by one skilled in the art.

In the embodiment illustrated in FIG. 1 it is assumed that wavelength component $\lambda_1$ is delayed a greater amount in transmission fiber 11 than component $\lambda_2$, $\lambda_2$ is a delayed a greater amount than $\lambda_3$, and $\lambda_{n-1}$ is delayed a greater amount than $\lambda_n$. Therefore, wavelength component $\lambda_1$ is injected into the longest delay line fiber 21, component $\lambda_2$ is injected into fiber 20 which provides slightly less delay than fiber 21 and so on so that component $\lambda_n$ is injected into the shortest delay line fiber 16. The lengths of the longest and shortest delay line fibers are such that the difference in the delay times thereof will expand the pulse width an amount sufficient to limit the data rate to the predetermined maximum data rate. The pulse fed to receiver 12 must be of sufficient width that when data is transmitted at a rate greater than the predetermined rate, a pulse will extend into the next time slot and generate a false pulse in the receiver when none is transmitted.

The required delay difference is determined as follows. The time duration $\tau_{bit}$ of a pulse at the output end of transmission fiber 11 is about 1/Bit Rate. For this discussion the pulse spreading caused by fiber 11 will be ignored since it is assumed that fiber 11 has a bandwidth much greater than that needed to transmit the predetermined bit rate. If the transmitted pulse undergoes some significant spreading $\Delta\tau_{system}$ during transmission, then the amount of spreading to be induced by dispersion transformer 14 can be reduced by $\Delta\tau_{system}$.

Assume that the maximum predetermined data rate for which a customer pays is 90 Mb/sec. The width of each pulse generated at the transmitter 10 is $1/90 \times 10^6$ sec or 11.1 ns. Further assume that $\Delta\tau_{system}$ is negligable and that the width of the pulse 31 (FIG. 3a) received at the output of fiber 11 is 11.1 ns. This pulse appears at point a in FIG. 1. The next time slot after pulse 31 would occur between times 32 and 33, and the time window in which the next pulse would be detected is indicated by dashed lines 34. The time lapse between time 32 and the beginning of window 34 is about 5 ns. Thus pulse 31 could be broadened by about 4.5 ns by dispersion transformer 14 and yet not extend into window 34. The broadened pulse 36, which appears at point b of FIG. 1, is shown in FIG. 3b.

To enable dispersion transformer 14 to broaden pulse 31 by 4.5 ns, fiber 21 provides a delay of 4.5 ns greater than the delay provided by fiber 16. Generally, each of fibers 17 through 21 provides a slightly greater delay than the next lower numbered fiber. Thus, there can be a relatively even power distribution throughout the entire duration of the broadened pulse 36.

If the customer attempts to upgrade the system to the next higher bit rate, i.e. 135 Mb/sec, operation of the system will be at least severely impaired. The width of each pulse generated at the 135 Mb/sec rate is 7.4 ns. Such a pulse 41 is shown in FIG. 4a where the next time slot occurs between times 42 and 43, and the detection window for the next pulse occurs between lines 44. At the 135 Mb/sec data rate the time lapse between time 42 and the beginning of window 44 is about 3 ns. Since dispersion transformer 14 is designed for operation at 90 Mb/sec, it broadens pulse 41 by 4.5 ns. Therefore, the 135 Mb/sec pulse 46 appearing at point b of FIG. 1 will extend into the next detection window 44. This will cause the generation of a false pulse after each pulse 46.

Use of dispersion transformer 14 will also prevent the customer from upgrading system performance by employing wave division multiplexing. Wavelength disperser/separator 15 is constructed to operate at a given band of wavelengths. If another band of wavelengths is generated at transmitter 11, it will not be effectively coupled by dispersion transformer 14 to receiver 12.

I claim:

1. In an optical transmission system in which a transmission optical fiber is capable of transmitting data at a rate which is much greater than the rate at which it is desired to transmit data, a method of limiting the information carrying capacity of said optical transmission system so that only a maximum predetermined data rate can be transmitted therethrough, said method comprising generating a pulsed optical signal having a plurality of wavelengths, propagating said optical signal through said transmission optical fiber, separating said optical signal into a plurality of spatially separated wavelength components, propagating said wavelength components through optical fiber delay means which subjects said wavelength components to different delays, the wavelength component which propagates with the least delay through said transmission optical fiber being subjected to the least induced delay in said optical fiber delay means and the wavelength component which propagates with the greatest delay through said transmission optical fiber being subjected to the greatest induced delay in said optical fiber delay means, those wavelength components which propagate through said transmission optical fiber with delays intermediate said least induced delay and said greatest induced delay being subjected in said optical fiber delay means to induced delays that are intermediate said least induced delay and said greatest induced delay, combining the delayed wavelength components to form a transformed optical signal comprising a series of broadened pulses, and detecting said series of broadened pulses.

2. A method in accordance with claim 1 wherein the step of generating comprises generating optical pulses, each of which has a predetermined pulse width, and wherein the step of detecting comprises ascertaining the existence of a pulse in one of a series of periodically occurring time windows, the center of each pulse emanating from said transmission optical fiber appearing near the center of one of said time windows, the absence of a pulse being ascertained by the absence of the occurrence of an optical pulse during one of said time windows, and wherein the difference in delay times between said greatest induced delay and said least induced delay is slightly less than the time lapse between the end of a pulse and the start of said window for the detection of the next pulse, said time lapse being measured at the output of said transmission fiber, whereby the generation of optical pulses at a rate sufficiently greater than said predetermined data rate results in the detection of broadened pulses the widths of which are sufficiently great that each such higher data rate pulse extends in time to the next time window after the time window for detecting that pulse.

3. In an optical transmission system in which a transmission optical fiber is capable of transmitting data at a rate which is much greater than the rate at which it is desired to transmit data, a system limiting the information carrying capacity of said optical transmission system so that only a maximum predetermined data rate can be transmitted therethrough, said system comprising

- means for generating a pulsed optical signal having a plurality of wavelengths,
- means for injecting said optical signal into said transmission optical fiber,
- means for separating the optical signal emanating from said transmission optical fiber into a plurality of spatially separated wavelength components,
- optical waveguide delay means for subjecting said wavelength components to different delays, the wavelength component which propagates with the least delay through said transmission optical fiber being subjected to the least induced delay in said optical fiber delay means and the wavelength component which propagates with the greatest delay through said transmission optical fiber being subjected to the greatest induced delay in said optical fiber delay means, those wavelength components which propagate through said transmission optical fiber with delays intermediate said least induced delay and said greatest induced delay being subjected in said optical fiber delay means to induced delays that are intermediate said least induced delay and said greatest induced delay,
- means for coupling said wavelength components from said means for separating to said optical fiber delay means,
- means for combining the delayed wavelength components to form a transformed optical signal comprising a series of broadened pulses, and
- means for detecting said series of broadened pulses.

4. A system in accordance with claim 3 wherein said means for generating comprises means for generating optical pulses, each of which has a predetermined pulse width, and wherein said means for detecting comprises means for ascertaining the existence of a pulse in a predetermined time window, said time window appearing near the center of a pulse as it emanates from said transmission optical fiber, and wherein the difference in delay times between said greatest induced delay and said least induced delay of said wavelength components by said optical waveguide delay means is slightly less than the time lapse between the end of a pulse and the start of said window for the detection of the next pulse, said time lapse being measured at the output of said transmission fiber.

5. In an optical transmission system in which a transmission optical fiber is capable of transmitting data at a rate which is much greater than the rate at which it is desired to transmit data, a method of limiting the information carrying capacity of said optical transmission system so that only a maximum predetermined data rate can be transmitted therethrough, said method comprising

- generating an optical signal having a plurality of wavelengths, said optical signal comprising optical pulses, each of which has a predetermined pulse width,
- propagating said optical signal through said transmission optical fiber,
- separating said optical signal into a plurality of spatially separated wavelength components,
- propagating said wavelength components through optical fiber delay means which subjects said wavelength components to different delays, the wavelength component which propagates with the least delay through said transmission optical fiber being subjected to the least induced delay in said optical fiber delay means and the wavelength component which propagates with the greatest delay through said transmission optical fiber being subjected to the greatest induced delay in said optical fiber delay means, those wavelength components which propagate through said transmission optical fiber with delays intermediate said least induced delay and said greatest induced delay being subjected in said optical fiber delay means to induced delays that are intermediate said least induced delay and said greatest induced delay,
- combining the delayed wavelength components to form a transformed optical signal comprising a series of broadened pulses, and
- detecting said series of broadened pulses by ascertaining the existence of a pulse in a predetermined time window, said time window appearing near the center of a pulse as it emanates from said transmission optical fiber, and wherein the difference in delay times between said greatest induced delay and said least induced delay is slightly less than the time lapse between the end of a pulse and the start of said window for the detection of the next pulse, said time lapse being measured at the output of said transmission fiber.

6. In an optical transmission system in which a transmission optical fiber is capable of transmitting data at a rate which is much greater than the rate at which it is desired to transmit data, a method of limiting the information carrying capacity of said optical transmission system so that only a maximum predetermined data rate can be transmitted therethrough, said method comprising

- generating an optical signal having a plurality of wavelengths, said optical signal comprising optical pulses, each of which has a predetermined pulse width,
- propagating said optical signal through said transmission optical fiber,
- separating said optical signal into a plurality of spatially separated wavelength components,
- propagating said wavelength components through optical fiber delay means which subjects said wavelength components to different delays, thereby broadening by a predetermined time duration each optical pulse propagating through said delay means,
- combining the delayed wavelength components to form a transformed optical signal comprising a series of broadened pulses, and
- detecting said series of broadened pulses by ascertaining the existence of a pulse in one of a series of periodically occurring time windows, the center of each pulse emanating from said transmission optical fiber appearing near the center of one of said time windows, the absence of a pulse being ascertained by the absence of the occurrence of an optical pulse during one of said time windows, and wherein said predetermined time duration is slightly less than the time lapse between the end of a pulse and the start of said window for the detection of the next pulse, said time lapse being measured at the output of said transmission fiber, whereby the generation of optical pulses at a rate sufficiently greater than said predetermined data rate results in the detection of broadened pulses the widths of which are sufficiently great that each such higher data rate pulse extends in time to the next time window after the time window for detecting that pulse

* * * * *